United States Patent [19]
Weber

[11] Patent Number: 5,480,134
[45] Date of Patent: Jan. 2, 1996

[54] MECHANISM FOR OPENING AND CLOSING A RESEALABLE CARTRIDGE

[75] Inventor: Anthony M. Weber, Woodbury, Minn.

[73] Assignee: Minnesota Mining and Manufacturing Company, St. Paul, Minn.

[21] Appl. No.: 239,509

[22] Filed: May 9, 1994

[51] Int. Cl.$^6$ ............................................. B65H 1/00
[52] U.S. Cl. ......................... 271/145; 271/162; 354/277; 354/283
[58] Field of Search ......................... 271/145, 162–164; 354/276, 277, 282, 283; 378/182, 184

[56] References Cited

U.S. PATENT DOCUMENTS

| | | | |
|---|---|---|---|
| 4,727,391 | 2/1988 | Tajima et al. | 354/277 |
| 5,008,694 | 4/1991 | Tajima et al. | 354/277 |
| 5,049,924 | 9/1991 | Moro et al. | 355/50 |
| 5,051,775 | 9/1991 | Yamakoshi et al. | 355/72 |
| 5,090,677 | 2/1992 | Yamakoshi et al. | 271/117 |
| 5,104,111 | 4/1992 | Matsuda et al. | 271/110 |
| 5,127,646 | 7/1992 | Matsuda et al. | 271/171 |
| 5,132,724 | 7/1992 | Lemberger et al. | 355/72 |
| 5,149,078 | 9/1992 | Matsuda et al. | 271/145 |
| 5,169,137 | 12/1992 | Matsuda et al. | 271/145 |
| 5,228,678 | 7/1993 | Matsuda et al. | 271/145 |

FOREIGN PATENT DOCUMENTS

| | | | |
|---|---|---|---|
| 3-33840 | 6/1989 | Japan | G03B 27/32 |
| 3-200634 | 12/1989 | Japan | B65H 1/26 |
| 3-200633 | 12/1989 | Japan | B65H 1/26 |
| 2-216144 | 8/1990 | Japan | G03C 3/00 |
| 2-306240 | 12/1990 | Japan | G03C 3/00 |
| 3-152027 | 6/1991 | Japan | B65H 1/26 |
| 5-24668 | 6/1991 | Japan | B65H 1/26 |
| 4-80126 | 3/1992 | Japan | B65H 1/04 |
| 4-80133 | 3/1992 | Japan | B65H 1/26 |
| 5-24671 | 2/1993 | Japan | B65H 1/26 |
| 5-24670 | 2/1993 | Japan | B65H 1/26 |
| 5-24669 | 2/1993 | Japan | B65H 1/26 |

*Primary Examiner*—David H. Bollinger
*Attorney, Agent, or Firm*—Gary L. Griswold; Walter N. Kirn; Steven J. Shumaker

[57] ABSTRACT

A mechanism for opening and closing a resealable cartridge includes a base for receiving a cartridge, a roller shaft for engaging a cover adhesively disposed on the cartridge, a motor for rotating the roller shaft, and a slidable carriage that supports the roller shaft and the motor. The motor rotates the roller shaft in a first direction to peel the cover away from the cartridge, and in a second direction to reseal the cover to the cartridge. The motor includes a rotor shaft, coupled in substantial alignment with the roller shaft, for applying rotational torque to the roller shaft without applying undesirable radial forces that can damage the cartridge cover, thereby extending cartridge life. The coupling of the rotor shaft also eliminates the need for a complicated gear train, resulting in reduced size, ease of repair, and enhanced reliability. The roller shaft includes a compliant friction coating that evenly distributes sealing force over the cover during closure. The compliant friction coating also produces added driving traction that helps the roller shaft drive the carriage during both the opening and closing operations, thereby avoiding stretching of the cover. The carriage is slidably coupled to the base, resulting in further size reductions. The mechanism is essentially modular in design, facilitating repairs and enabling replacement of the mechanism with a spare to reduce down time.

40 Claims, 6 Drawing Sheets

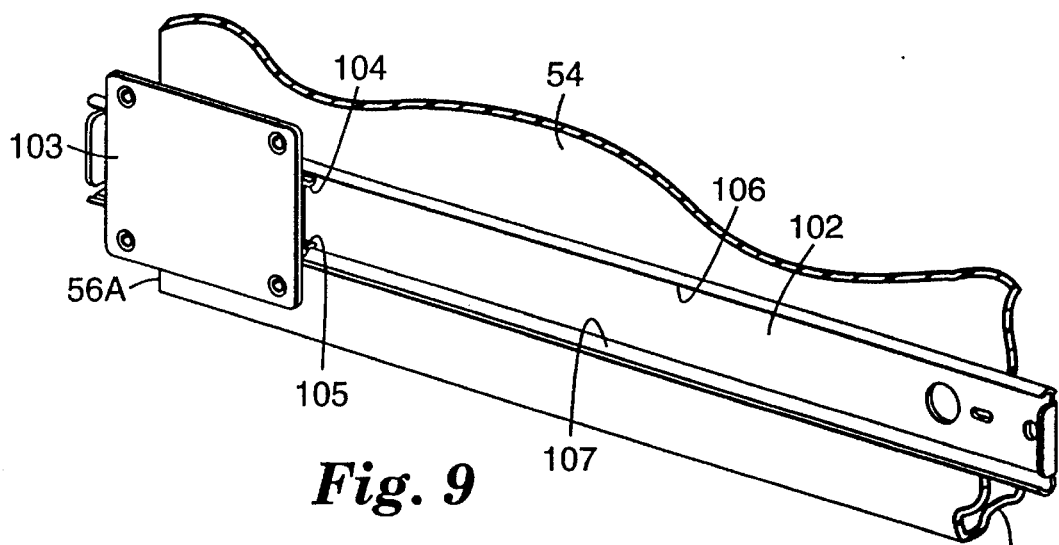
Fig. 9
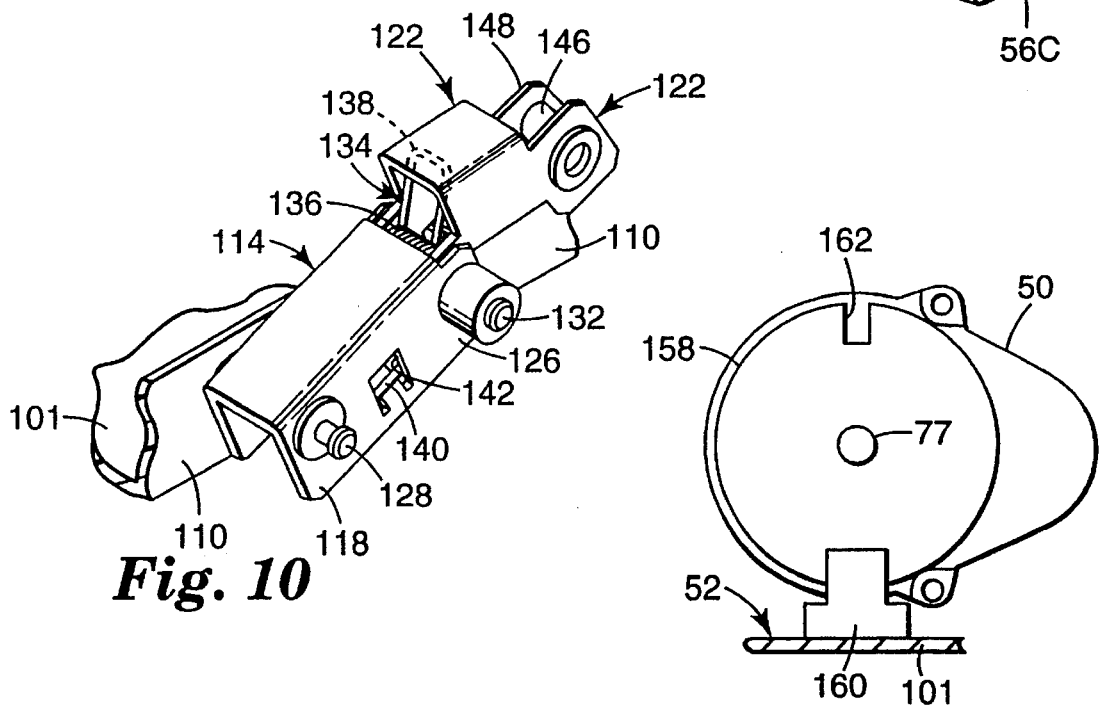
Fig. 10
Fig. 12
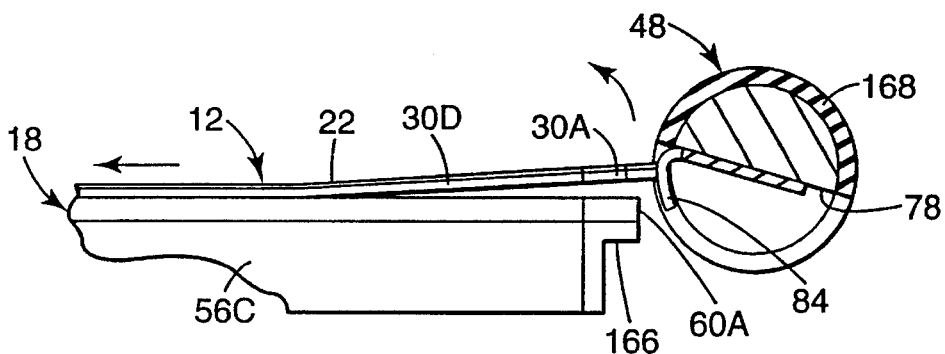
Fig. 13

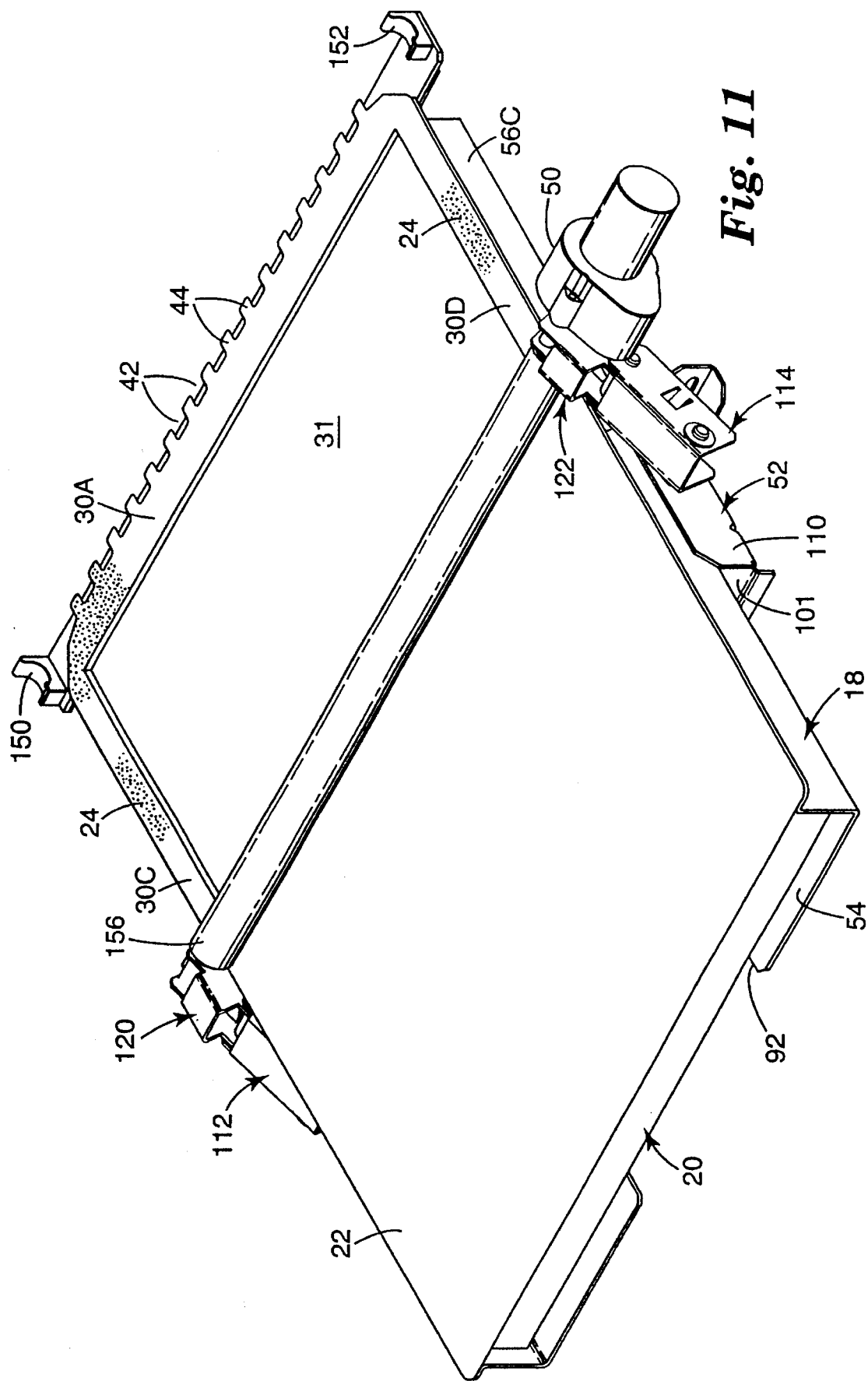

MECHANISM FOR OPENING AND CLOSING A RESEALABLE CARTRIDGE

FIELD OF THE INVENTION

The present invention relates to resealable cartridges, and, more particularly, to mechanisms for opening and closing resealable cartridges.

DISCUSSION OF RELATED ART

Resealable cartridges are useful in various applications for transporting articles. In many cases, resealable cartridges are desirable to prevent exposure of the transported articles to environmental elements. Laser imaging machines, in particular, make extensive use of resealable cartridges to transport photosensitive media. A laser imaging machine forms an image by scanning a modulated laser beam across the photosensitive media. Prior to imaging, a cartridge containing one or more photosensitive media is loaded into the laser imaging machine. The photosensitive media cartridge includes a light opaque tray having a media access opening. The cartridge tray includes a lip carrying an adhesive material to which a flexible cover is adhesively attached. The flexible cover extends over the media access opening to effect a light-tight seal of the cartridge. The light-tight seal enables the media cartridge to be transported in lighting conditions that otherwise would result in exposure of the photosensitive media contained within the cartridge. An example of a resealable photosensitive media cartridge is disclosed in U.S. Pat. No. 5,132,724, to Lemberger et al., assigned to Minnesota Mining & Manufacturing Company, the assignee of the present application.

The interior of a laser imaging machine provides a light-tight environment. To carry out an imaging operation, the laser imaging machine opens the cover on the tray and withdraws one or more photosensitive media from the access opening. After withdrawing the media, the laser imaging machine closes the flexible cover against the adhesive material carried on the lip of the cartridge tray, thereby resealing the access opening. In the ordinary course of use, the resealable media cartridge must be opened and closed several times. In particular, if the media cartridge is not emptied prior to removal from the light-tight interior of the laser imaging machine, the access opening must be resealed to avoid exposure of the photosensitive media. If the seal is rendered ineffective due to cartridge wear or damage, the entire cartridge is either discarded or recycled.

Laser imaging machines presently employ a relatively complicated and expensive mechanism for opening and closing a resealable photosensitive media cartridge. Examples of this type of mechanism are disclosed in above-mentioned U.S. Pat. No. 5,132,724, and in U.S. Pat. No. 5,149,078, to Matsuda et al., assigned to Minolta Camera Company, the content of which is incorporated herein by reference. A mechanism of the type disclosed in the above patents generally comprises a base, roller shaft, motor, gear train, solenoid, two racks and pinions, and numerous brackets and springs. The base receives and supports the photosensitive media cartridge for the opening and closing operation. The roller shaft includes means for engaging an edge of the flexible cover disposed over the photosensitive media cartridge. The roller shaft may include, for example, radially extending projections for engaging apertures formed in an edge of the cover.

To open the cartridge, the motor drives the shaft through the gear train to wind the flexible cover about the shaft, thereby peeling the cover away from the adhesive material on the lip of the cartridge tray. As the flexible cover opens, the shaft, motor, and gear train travel forward along the cartridge on a slidable carriage mounted across the two pinions. The pinions engage the racks, which are fixed relative to the base. To close the cartridge, the solenoid is energized to pivot a gear in the gear train. The pivoted gear transfers motor torque to the pinions, but not to the shaft. The rotating pinions cause the carriage to travel backward along the fixed racks. The movement of the carriage causes the shaft to rotate, thereby unwinding the flexible cover. As the cover unwinds, a pair of springs bias the rotating shaft downward toward the lip of the cartridge to reapply the flexible cover to the adhesive material on the lip of the cartridge tray.

Although the type of opening and closing mechanism disclosed in the above patents can provide effective sealing for a period of time/a number of improvements are desirable due to certain disadvantages. For instance, the number and complexity of the components required by the mechanism contribute to an undesirably high manufacturing cost and low reliability. Because the racks are mounted to the laser imaging machine itself, it is not possible to remove the entire mechanism from the machine in one piece. Therefore, the mechanism cannot be replaced with a spare during repairs. The complicated design of the mechanism also tends to make repairs difficult, resulting in extended down time for the laser imaging machine in which the mechanism is housed. Further, the mounting of the racks and the arrangement of the pinions, carriage, gear train, and motor above the racks also produces a tall profile that occupies considerable space within the laser imaging machine. Finally, the opening and sealing operation of the mechanism can damage the flexible cover of the media cartridge, inevitably resulting in ineffective sealing and limited cartridge life.

Specifically, forces produced by the springs, gear train, and carriage result in damage to the flexible cover. First, at the start of the opening operation, the roller shaft occupies a position below the cartridge lip. By engaging the apertures in the cartridge cover, the projections provide a pulling force that enables the roller shaft to "climb" up over the cartridge lip. However, the springs apply a downward force that must be overcome by the roller shaft to move upward. The spring force causes the projections to pull harder on the apertures than would otherwise be necessary, resulting in tearing of the apertures. Second, during the opening operation, the gear train applies a significant amount of radial force that pushes the shaft downward against the cartridge in an uneven manner. The radial force generated by the gear train causes the projections on the shaft to tear the apertures formed in the flexible cover upon engagement. The radial force also causes the shaft to stretch the flexible cover beyond its proper length. Third, during the closing operation, the moving carriage applies a force extending parallel to the surface of the flexible cover that causes further stretching of the flexible cover.

The torn apertures prevent proper engagement of the cover and shaft during subsequent open and close cycles, and ultimately prevent engagement entirely. In addition, because the flexible cover is precisely sized relative to the cartridge tray to provide an effective light-tight seal, the stretch in the cover causes inaccurate registration of the cover with the cartridge tray during closure, and also produces wrinkles along the edges of the cover through which light can enter. The torn apertures directly reduce the life of a resealable cartridge due to the inability to engage the cover. The stretch of the cover more indirectly reduces the life of a resealable cartridge due to the unacceptable effectiveness of the seal applied to the cartridge tray. Efforts have been made to construct the cover from a stretch-resistant material and to add a reinforcing strip adjacent to the apertures to resist tearing. Although such efforts have achieved some extent of added durability, the lifetime of a resealable cartridge continues to be limited to approximately fifteen open and close cycles when used with existing opening and closing mechanisms.

SUMMARY OF THE INVENTION

In view of the foregoing disadvantages, the present invention is directed to a mechanism for opening and closing a resealable cartridge that achieves reduced cost, increased reliability, reduced size, enhanced cartridge life, superior cartridge resealing, and modularity.

Additional features and advantages of the invention will be set forth in part in the description that follows, and in part will be apparent from the description, or may be learned by practice of the invention. The advantages of the invention will be realized and attained by the system particularly pointed out in the written description and claims hereof, as well as in the appended drawings.

To achieve the foregoing advantages, as broadly embodied and described herein, the present invention provides, in a first embodiment, a mechanism for opening and closing a resealable cartridge having a tray and a cover resealably engaged with the tray, the mechanism comprising a base for receiving the tray of the cartridge, a roller shaft including means for engaging the cover of the cartridge, and a motor, having a rotor shaft coupled to the roller shaft such that a central longitudinal axis of the rotor shaft is in substantial alignment with a central longitudinal axis of the roller shaft, for rotating the roller shaft in a first direction to wind the cover about the roller shaft, thereby removing at least part of the cover from the tray, and for rotating the roller shaft in a second direction to unwind the cover from the roller shaft, thereby resealably engaging the cover with the tray.

In a second embodiment, the present invention provides a mechanism for opening and closing a resealable cartridge having a tray and a cover resealably engaged with the tray, the mechanism comprising a base for receiving the tray of the cartridge, a roller shaft including means for engaging the cover of the cartridge, and a surface having a compliant friction coating, and a motor for rotating the roller shaft in a first direction to wind the cover about the roller shaft, thereby removing at least part of the cover from the tray, and for rotating the roller shaft in a second direction to unwind the cover from the roller shaft, thereby resealably engaging the cover with the tray.

In a third embodiment, the present invention provides a mechanism for opening and closing a resealable cartridge having a tray and a cover resealably engaged with the tray, the mechanism comprising a base for receiving the tray of the cartridge, a roller shaft including means for engaging the cover of the cartridge, a motor for rotating the roller shaft in a first direction to wind the cover about the roller shaft, thereby removing at least part of the cover from the tray, and for rotating the roller shaft in a second direction to unwind the cover from the roller shaft, thereby resealably engaging the cover with the tray, and a carriage slidably coupled to the base, the carriage supporting the roller shaft and the motor, and being slidable along a path of motion relative to the base during the rotation of the roller shaft by the motor.

In a fourth embodiment, the present invention provides a mechanism for opening and closing a resealable cartridge having a tray and a cover resealably engaged with the tray, the mechanism comprising a base for receiving the tray of the cartridge, a roller shaft including means for engaging the cover of the cartridge, a motor for rotating the roller shaft in a first direction to wind the cover about the roller shaft, thereby removing at least part of the cover from the tray, and for rotating the roller shaft in a second direction to unwind the cover from the roller shaft, thereby resealably engaging the cover with the tray, a carriage being slidable along a path of motion relative to the base during the rotation of the roller shaft by the motor, a pair of carriage brackets, each one of the pair of carriage brackets having a first end pivotably coupled to the carriage, a pair of shaft brackets, each one of the pair of shaft brackets having a first end pivotably coupled to a second end of one of the pair of carriage brackets, wherein each one of the pair of shaft brackets rotatably supports the roller shaft, and one of the pair of shaft brackets supports the motor, and a pair of springs, each one of the pair springs coupled between one of the pair of shaft brackets and one of the pair of carriage brackets, wherein the pair of springs bias the roller shaft toward the base during the rotation of the roller shaft by the motor.

In a fifth embodiment, the present invention provides a mechanism for opening and closing a resealable cartridge having a tray and a cover resealably engaged with the tray, the mechanism comprising a base for receiving the tray of the cartridge, a roller shaft including means for engaging the cover of the cartridge, a motor for rotating the roller shaft in a first direction to wind the cover about the roller shaft, thereby removing at least part of the cover from the tray, and for rotating the roller shaft in a second direction to unwind the cover from the roller shaft, thereby resealably engaging the cover with the tray, and reset means, responsive when a rotational angle of the roller shaft differs from a desired rotational angle, for controlling the motor to rotate the roller shaft in the second direction until the rotational angle of the roller shaft corresponds to the desired rotational angle.

It is to be understood that both the foregoing general description and the following detailed description are exemplary and explanatory only, and not restrictive of the invention, as claimed.

The accompanying drawings are included to provide a further understanding of the invention and are incorporated in and constitute a part of this specification. The drawings illustrate exemplary embodiments of the invention and together with the description serve to explain the principles of the invention.

BRIEF DESCRIPTION OF THE DRAWINGS

FIG. 9 is an isometric view of a linear guide track for slidably supporting a carriage forming part of the opening and closing mechanism shown in FIG. 5, in accordance with the present invention;

FIG. 10 is an isometric view of a bracket arrangement forming part of the opening and closing mechanism shown in FIG. 5, in accordance with the present invention;

FIG. 11 is an isometric view of the opening and closing mechanism shown in FIG. 5 during a cartridge opening operation, in accordance with the present invention;

FIG. 12 is an illustration of a reset means for restoring the roller shaft to a proper rotational position, in accordance with the present invention; and FIG. 13 is an illustration of the operation of the reset means shown in FIG. 12.

DETAILED DESCRIPTION OF THE PREFERRED EMBODIMENTS

Reference will now be made in detail to exemplary embodiments of the invention. One skilled in the art, given the description herein, will recognize the utility of the system of the present invention in a variety of applications generally involving the use of resealable cartridges. However, for ease of description, as well as for purposes of illustration, the present invention primarily will be described in the context of the use of resealable cartridges containing photosensitive media useful in laser imaging.

Figure 1:
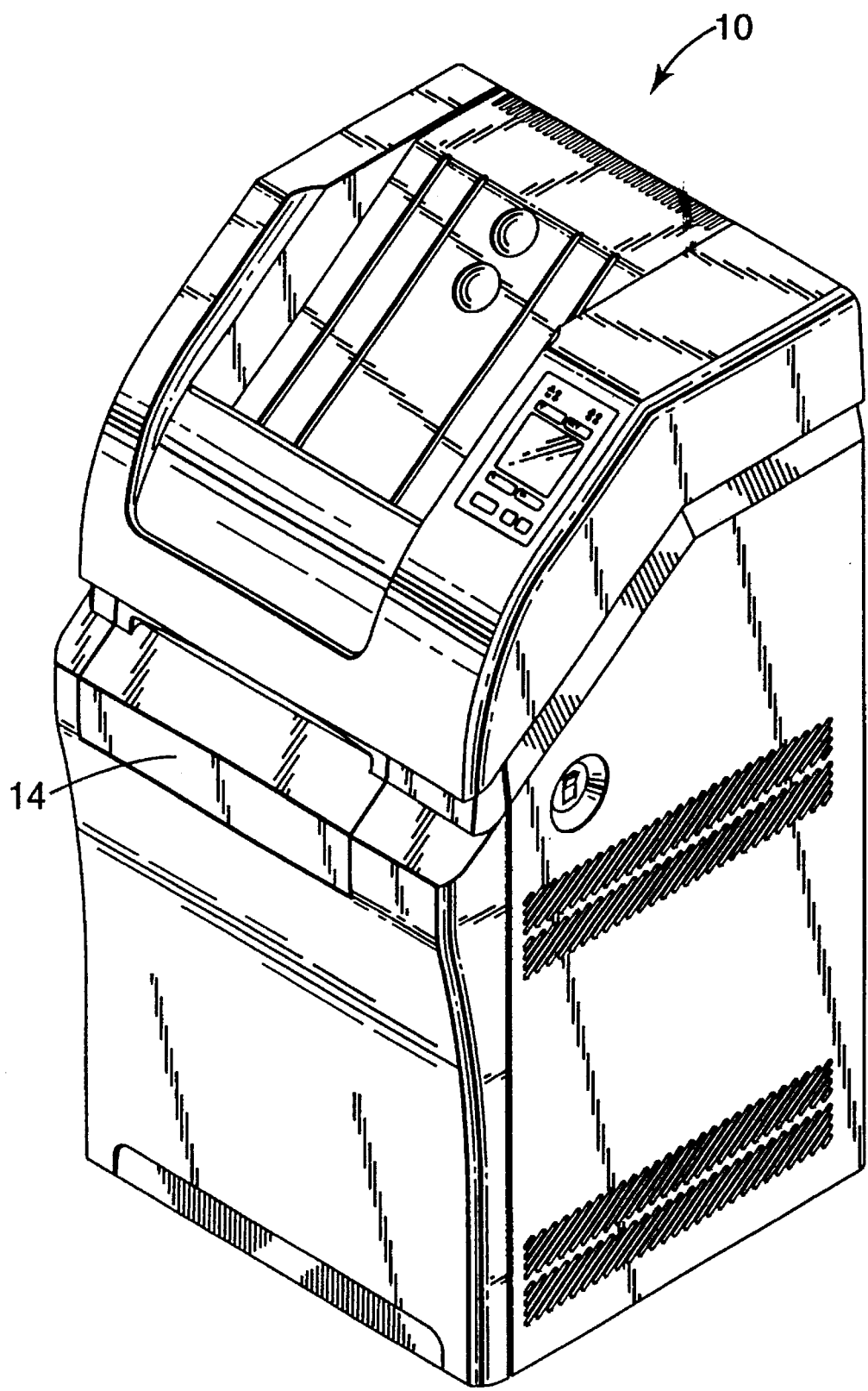
FIG. 1 is an illustration of an exemplary laser imaging machine configured for use with a resealable photosensitive media cartridge, and suitable for incorporation of an opening and closing mechanism in accordance with the present invention.
Figure 2:
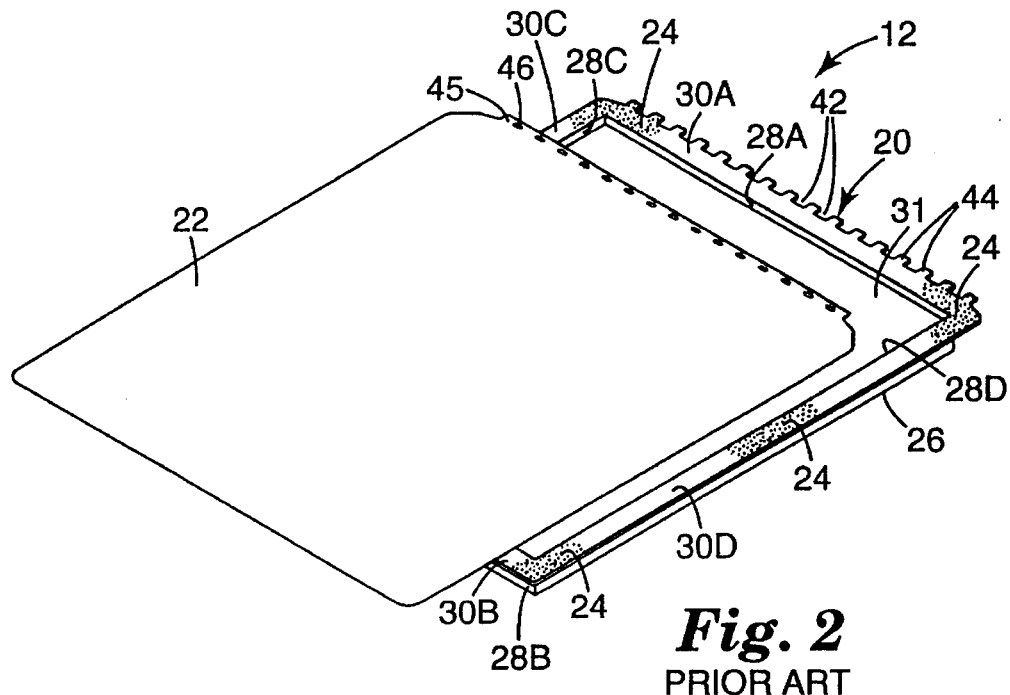
FIG. 2 is an isometric view of a resealable photosensitive media cartridge with the cover removed.
Figure 3:
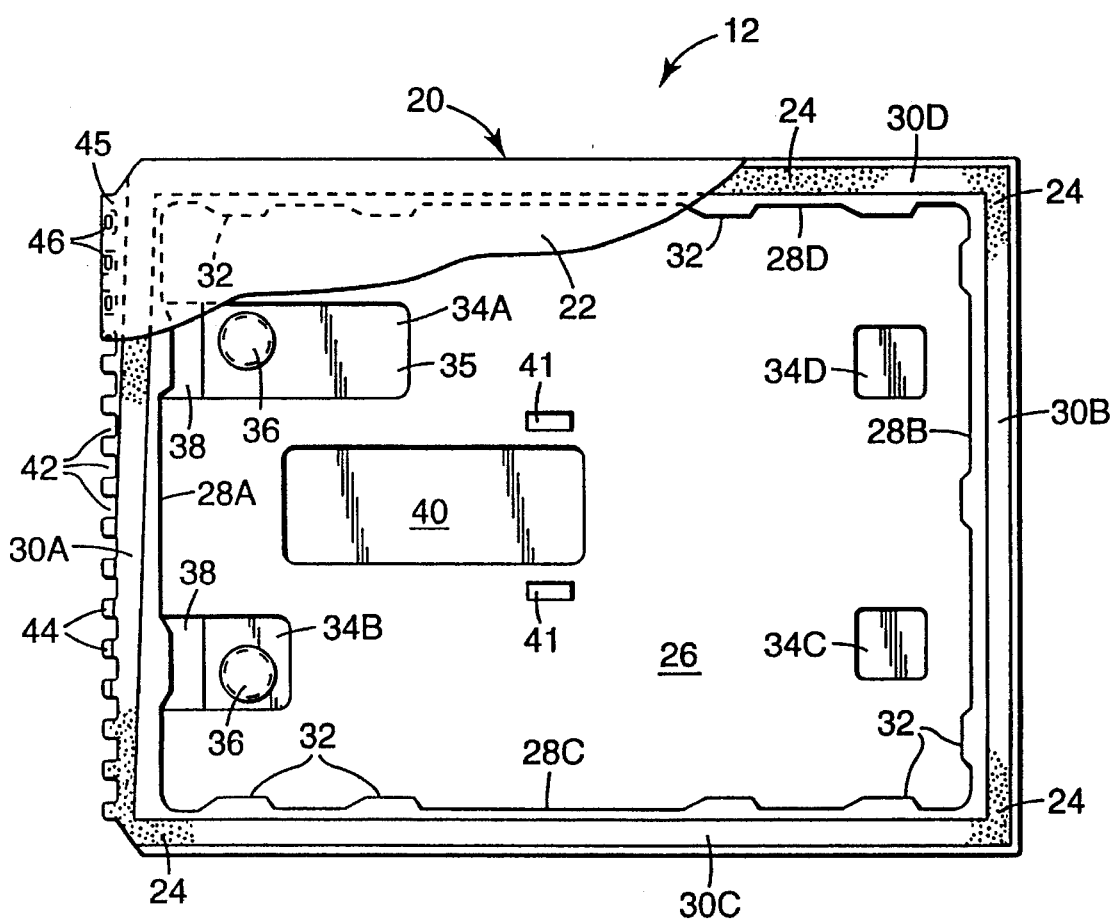
FIG. 3 is a top view of the cartridge shown in FIG. 2 with a portion of the cover removed.
Figure 4:
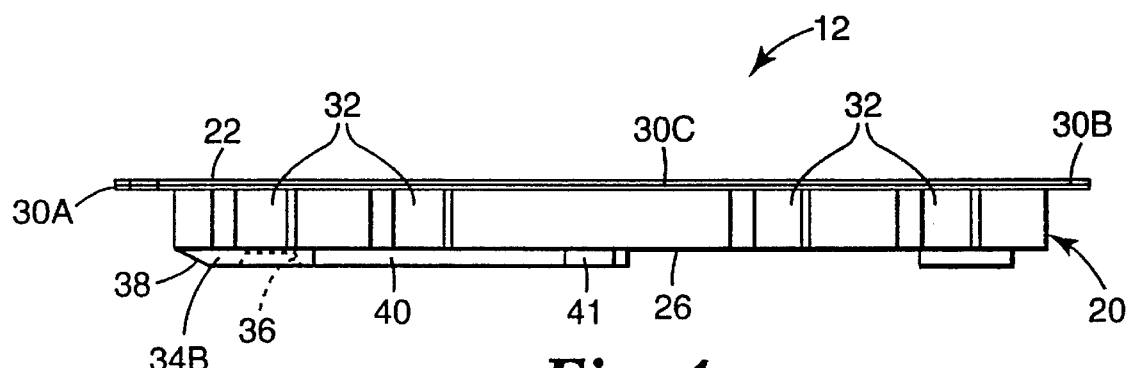
FIG. 4 is a side view of the cartridge shown in FIG. 2.
Figure 5:
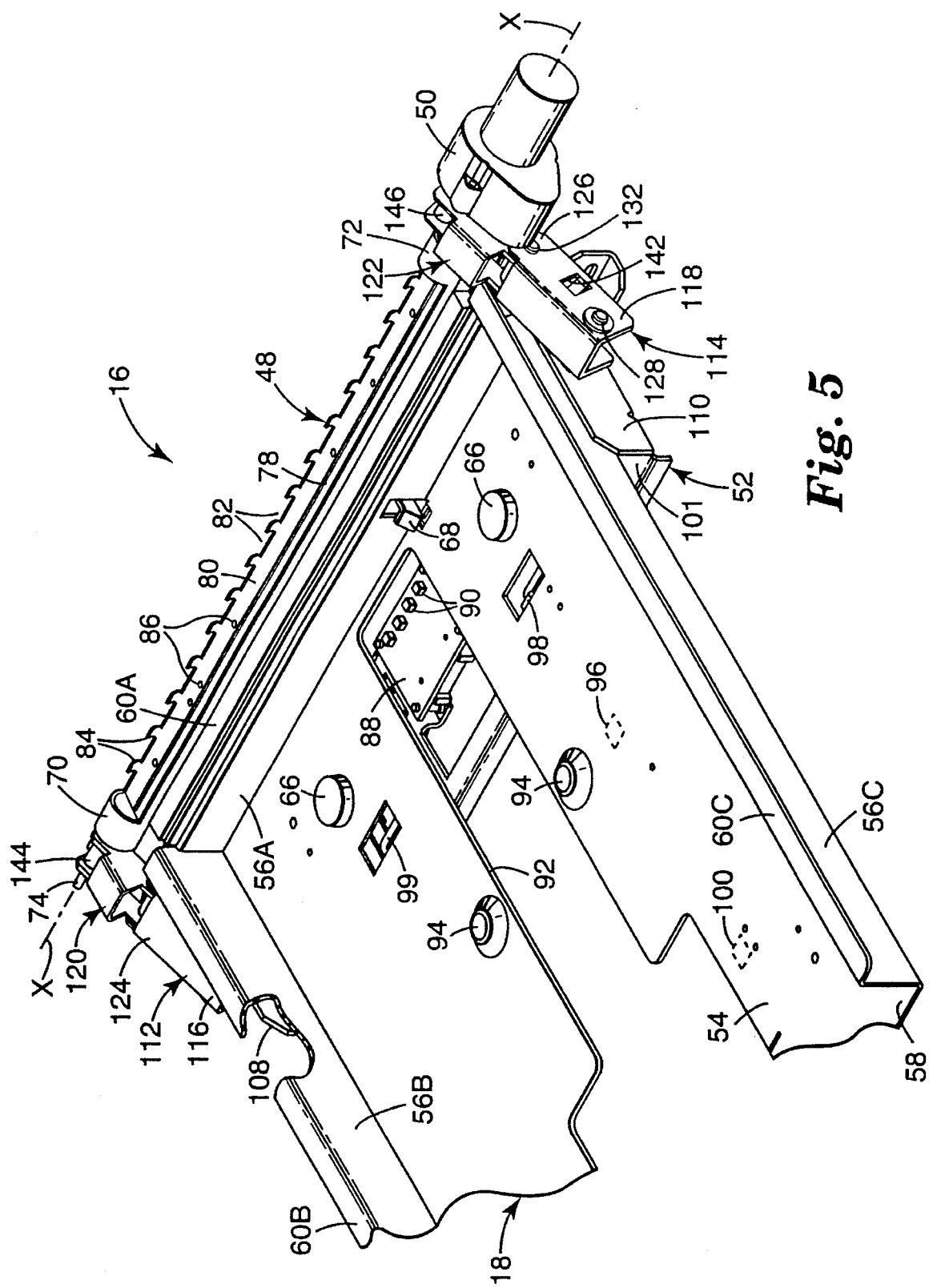
FIG. 5 is an isometric view of a mechanism for opening and closing the cartridge shown in FIG. 2, in accordance with the present invention.

FIG. 1 is an illustration of a laser imaging machine 10 configured to operate with a resealable photosensitive media cartridge, and suitable for incorporating a mechanism for opening and closing such a cartridge. An example of a resealable photosensitive media cartridge, as disclosed in abovementioned U.S. Pat. No. 5,132,724, is shown in FIGS. 2-4 and designated generally by reference numeral 12. The content of U.S. Pat. No. 5,132,724 is incorporated herein by reference. An exemplary embodiment of an opening and closing mechanism, in accordance with the present invention, is shown in FIG. 5 and designated generally by reference numeral 16.

The laser imaging machine 10 includes a hinged loading door 14 into which cartridge 12 is loaded for imaging operations. Other suitable laser imaging machines alternatively may employ a loading drawer that slides out to receive cartridge 12. The opening and closing mechanism 16 is mounted inside loading door 14, and includes a base 18, shown in FIG. 5, for receiving and supporting cartridge 12. After cartridge 12 has been loaded into base 18, a user closes loading door 14 to seal the cartridge within a light-tight environment. The opening and closing mechanism 16 then opens cartridge 12 to permit access to the photosensitive media contained with the cartridge. Imaging hardware associated with laser imaging machine 10 removes the photosensitive media from the opened cartridge 12 and performs imaging operations. After imaging is completed, opening and closing mechanism 16 closes cartridge 12 to provide a light-tight seal before cartridge 12 is removed from laser imaging machine 10.

The structure of cartridge 12 will now be described in detail with reference to FIGS. 2-4. The cartridge 12 includes an optically opaque media-receiving tray 20 and a flexible, optically opaque cover 22. The flexible cover 22 is resealably mounted to tray 20 by adhesive material 24. The tray 20 may be molded in one piece from a photo-inert, polyolefin material. The tray 20 includes a bottom wall 26, front wall 28A, rear wall 28B, opposite side walls 28C, 28D, and a lip having sections 30A–30D extending outward from the upper edges of walls 28A–28D, respectively, around a periphery of the tray. The adhesive material 24 may take the form of segments of adhesive disposed at intervals along lip sections 30A–30D, or a one-piece adhesive gasket applied to the lip. The side walls 28A–28D and lip sections 30A–30D define an access opening. For laser imaging, the access opening may contain one or more photosensitive media 31, as shown in FIG. 2. The photosensitive media 31 may comprise, for example, photosensitive film, photosensitive paper, or other photosensitive substrate materials for imaging applications.

As shown in FIGS. 3 and 4, tray 20 includes inward projecting guides 32 formed on walls 28A–28D for properly positioning photosensitive media 31. Feet 34A–34D are formed into and extend downward from bottom wall 26 to support cartridge 12 within base 18 of opening and closing mechanism 16, shown in FIG. 5. A media presence monitoring well 35 also is formed in bottom wall 26. A media presence monitoring sensor associated with laser imaging machine 10 extends into well 35 below the surface of bottom wall 26 when all media have been removed from tray 20, thereby detecting that the tray is empty. The bottom wall 26 further includes positioning recesses 36, molded into feet 34A and 34B, that extend upward into tray 20 from the exterior surface of the bottom wall. The positioning recesses 36 receive locator pins extending from base 18 of opening and closing mechanism 16, shown in FIG. 5. The locator pins secure and properly orient cartridge 12 within base 18 when the cartridge is loaded via loading door 14.

The feet 34A, 34B formed adjacent front wall 28A include ramp surfaces 38 that slope downward from the lower edge of the front wall, as shown in FIG. 4. The ramp surfaces 38 guide feet 34A, 34B over the locator pins formed in base 18 when cartridge 12 is loaded into the base. The tray 20 further includes a recessed area 40 formed in bottom wall 26 that provides a platform on the exterior surface of the bottom wall. The platform formed by recessed area 40 carries bar code indicia for identifying the type of media contained in cartridge 12. A pair of feet 41, formed as downward extending recesses in bottom wall 26, ensure proper vertical positioning of the bar code relative to a bar code reader associated with opening and closing mechanism 16.

With reference to FIGS. 2 and 3, a series of evenly spaced cut-out sections 42 are formed in lip section 30A over the top edge of front wall 28A. The cut-out sections 42 define a series of spaced projections 44 on lip section 30A. A forward area 45 of cover 22 includes a series of elongated apertures 46 aligned with cut-out sections 42 of tray 20 when the cover is disposed over the tray. The cut-out sections 42 cooperate with apertures 46 to facilitate engagement of cover 22 by opening and closing mechanism 16.

The cover 22 is a flexible, photo-inert and optically opaque sheet of material sized to extend over the media access opening of tray 20 and mate with lip sections 30A–30D. The cover 22 comprises a material that is preferably stretchable enough to avoid pulling away from tray 20 when cartridge 12 is flexed, but rigid enough to resist excessive stretching during opening and closing operations. The cover 22 may also include a reinforcing strip (not shown) at a forward area 45 to increase the rigidity of the cover in the area above cut-out sections 42 of tray 20. The reinforcing strip is intended to resist tearing of apertures 46 during engagement with opening and closing mechanism 16. The stretch-resistant material and reinforcing strip of cover 22 are designed to resist the damage caused by certain forces applied to the cover during the opening and closing operations, and thus address the effects of such forces in an effort to extend cartridge life.

However, opening and closing mechanism 16 is designed to eliminate the application of the forces responsible for stretching cover 22 and tearing apertures 46, thereby addressing the source of such problems. An exemplary embodiment of the opening and closing mechanism of the present invention will now be described in detail with reference to FIGS. 5–13. As shown in FIG. 5, opening and closing mechanism 16 includes base 18 for receiving and supporting resealable photosensitive media cartridge 12, a roller shaft 48 including means for engaging cover 22, a motor 50 for rotating roller shaft 48, and a carriage 52, slidably coupled to base 18, for supporting roller shaft 48 and motor 50.

The base 18 can be mounted inside loading door 14 of laser imaging machine 10 by one or more support brackets (not shown). The entire opening and closing mechanism 16, including base 18, can be removed from laser imaging machine 10 by simply unfastening the base from the support brackets. The modularity of opening and closing mechanism 16 facilitates repairs, and allows the mechanism to be removed from the imaging site. In addition, during repairs, opening and closing mechanism 16 can be replaced with a spare to reduce down-time of laser imaging machine 10.

The base 18 includes a bottom wall 54, a front wall 56A, and a pair of opposite side walls 56B, 56C. A rear area 58 of base 18 opposite front wall 56A is left open, i.e, without a wall, to accommodate loading of resealable cartridge 12. Thus, when base 18 is mounted within laser imaging machine 10, the open rear area 58 is positioned proximal to loading door 14. The front wall 56A, side wall 56B, and side wall 56C include, respectively, lip sections 60A, 60B, and 60C, extending outward from the upper edges of the walls. Lip sections 60A–60C of base 18 support lip sections 30A, 30C, and 30D, respectively, of cartridge 12 upon loading. Lip section 60A, formed above front wall 56A, may be formed from a rubber pad mounted on base 18, whereas lip sections 60B and 60C may be formed integral with base 18.

The cartridge 12 is loaded into laser imaging machine 10 by opening the loading door 14 and sliding the cartridge, lip section 30A first, into base 18 toward front wall 56A. As cartridge 12 approaches its proper position in base 18, ramp surfaces 38 encounter locator pins 66 formed in bottom wall 54. As a result, feet 34A, 34B glide up over locator pins 66, causing lip section 30A to be raised over lip section 60A of base 18. With continued motion, positioning recesses 36 drop over locator pins 66 to secure cartridge 12. The locator pins 66 extend into positioning recesses 36, ensuring that cartridge 12 is received and held precisely in a proper position for effectively opening and closing flexible cover 22. The front wall 28A of cartridge tray 20 engages a sensor switch 68, mounted within front wall 56A, when the proper loading position has been reached. The sensor switch 68 then generates a ready signal. After a user closes door 14, opening and closing mechanism 16 initiates an opening operation by rotating roller shaft 48 with motor 50.

Figure 6:
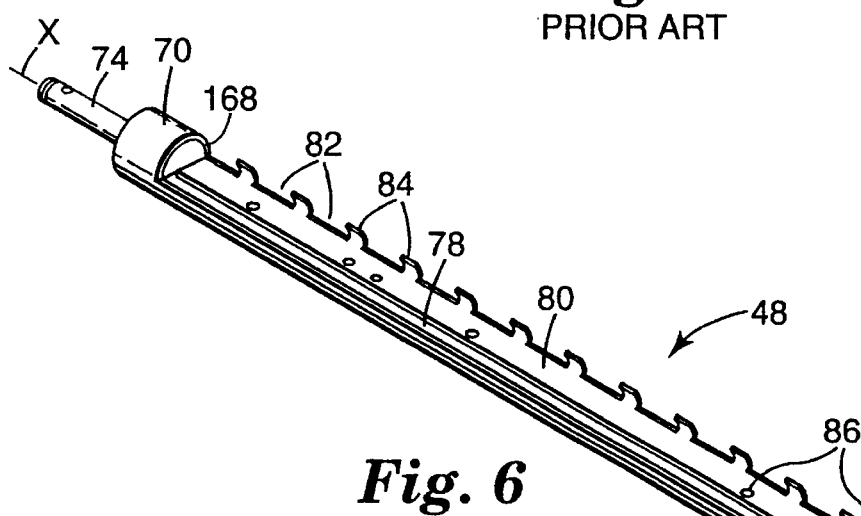
FIG. 6 is a view of a roller shaft forming part of the opening and closing mechanism shown in FIG. 5, in accordance with the present invention.
Figure 7:
FIG. 7 is a side view of the roller shaft shown in FIG. 6.

With reference to FIGS. 5–7, roller shaft 48 is an elongated member having end sections 70 and 72 of substantially circular cross-section aligned to travel along lip sections 60B and 60C, respectively, of base 18. The roller shaft 48 may be formed of steel. As shown in FIG. 6, a pair of mounting pins 74, 76 extend from end sections 70, 72, respectively, along a central longitudinal axis "X" of the shaft. A cut-out, winding section 78, extending between end sections 70, 72, includes means for engaging apertures 46 in cover 22 to open and close cartridge 12. As shown in FIG. 7, winding section 78 has a substantially semi-circular cross-section. In the embodiment shown in FIGS. 5–7, the cover engaging means of roller shaft 48 comprises an elongated, rectangular plate 80 having a plurality of indentations 82 defining curved, tooth-like projections 84.

Figure 8:
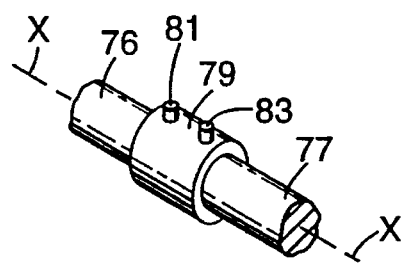
FIG. 8 is a view of a coupler for coupling the roller shaft and a rotor shaft forming part of the opening and closing mechanism shown in FIG. 5, in accordance with the present invention.

The projections 84 preferably have a radius of curvature slightly less than that of the radii of end sections 70, 72, and are sized and spaced to fit within apertures 46 of cover 22, as well as cut-out sections 42, when roller shaft 48 is rotated downward toward base 18. The plate 80 and projections 84 may be constructed by stamping them out of a piece of sheet metal, and fastening them with screws 86 to a portion of winding section 78 that has been cut down to approximately a half diameter. The radius of curvature of projections 84 can be achieved by bending the plate 80 about a metal form. The above method of constructing roller shaft 48 is advantageous because it is less costly than existing methods in which a steel shaft is carved with a special milling tool to define projections 84. In addition, with the above method, the projections 84 can be made longer with a more accurately curved profile that is better suited to engage apertures 46 of cover 22 without causing damage. With reference to FIG. 8, motor 50 includes a rotor shaft 77 coupled to roller shaft 48 such that a central longitudinal axis of the rotor shaft is in substantial alignment with a central longitudinal axis of roller shaft 48. As shown in FIG. 8, rotor shaft 77 of motor 50 preferably is coupled to mounting pin 76 with a small, cylindrical coupler 79. The coupler 79 may be fastened to the ends of mounting pin 76 and rotor shaft 77 with pins 81, 83, respectively, to allow a small amount of play between the rotor shaft and roller shaft 48. However, coupler 79 should maintain a degree of alignment sufficient to avoid the transmission of undesirable radial forces to roller shaft 48. The motor 50 rotates roller shaft 48 in a first direction to engage projections 84 with apertures 46 of cover 22. Continued rotation of roller shaft 48 in the first direction winds cover 22 about the roller shaft, thereby peeling the cover away from the adhesive material 24 disposed on lip sections 30A, 30C, and 30D of cartridge tray 20. Thus, rotation of roller shaft 48 in the first direction serves to open cartridge 12. The motor 50 rotates roller shaft 48 in a second direction, opposite to the first direction, to close cartridge 12. Specifically, rotation in the second direction unwinds cover 22 from roller shaft 48, thereby resealably engaging the cover with the adhesive material 24 disposed on lip sections 30A, 30C, and 30D of cartridge tray 20.

The rotation of roller shaft 48 in the first direction generates tractional force between the roller shaft and cartridge 12. A bias means, comprising a pair of springs, to be described, apply a normal force that biases roller shaft 48 downward against cartridge 12, producing additional traction. The carriage 52 includes means for supporting roller shaft 48 and motor 50, as will be described. The tractional force results in translational force that drives carriage 52 to slide along cartridge tray 20 in a direction away from front wall 56A. Tractional force generated between roller shaft 48 and cover 22 during the closing operation similarly provides translational force that drives carriage 52 to slide in a direction toward front wall 56A.

The use of cylindrical coupler 79 to couple rotor shaft 77 of motor 50 to roller shaft 48 avoids the need for a complicated gear train to rotate the roller shaft. The elimination of the number of parts associated with a gear train reduces the cost, complexity, and size of opening and closing mechanism 16, and increases reliability. Moreover, because coupler 79 maintains substantial alignment of the central longitudinal axes of rotor shaft 77 and roller shaft 48, motor 50 applies only the torque necessary to rotate the roller shaft. The alignment of rotor shaft 77 and roller shaft 48 thereby eliminates the generation of undesirable radial forces that can stretch cover 22 and tear apertures 46, enhancing the life of resealable cartridge 12.

The carriage 52 is slidably coupled to base 18, and is slidable along a path of motion relative to base 18 during opening and closing operations. A bar code reader 88, having a set of optical detectors 90, is mounted on carriage 52 under an exterior surface of bottom wall 54. The bar code reader 88 is aligned within a cut-out channel 92 of bottom wall 54 such that optical detectors 90 receive the bar code indicia carried by cartridge tray 20. As cartridge 12 is pushed along bottom wall 54 during loading, bottom wall 28A of cartridge tray 20 encounters guides 94 formed in bottom wall 54 of base 18. The guides 94 maintain a minimum distance between the bar code indicia carried on platform 40 and optical detectors 90 to ensure the proper focal length.

During an opening operation, carriage 52 slides away from front wall 56A. During the closing operation, carriage 52 slides toward front wall 56A. Approximately midway through the opening operation, a small tab 96 extending downward from bottom wall 54 trips optical sensor 98 mounted on carriage 52, activating bar code reader 88 to read the bar code indicia carried by recessed area 40. A time signal encoded in the bar code notifies software associated with bar code reader 88 when reading is completed. When the opening operation is completed, another small tab 100 extending from bottom wall 54 trips sensor 98 to indicate that the opening operation should be stopped. A plurality of spaced tabs can be formed by attaching a plate carrying the tabs to the exterior surface of bottom wall 54. In addition to indicating the start of bar code reading and the end of the opening operation, as performed by tabs 96 and 100, the spaced tabs can be used in conjunction with sensor 98 as timing indicators to detect stall of motor 50. A second plate carrying tabs can also be attached to trip a sensor 99 also mounted on carriage 52.

The carriage 52 includes an elongated base plate 101 that extends in a direction generally transverse to the path of motion of carriage 52. The base plate 101 is slidably engaged with at least one guide means mounted on the exterior surface of bottom wall 54. The guide means may comprise a pair of linear guide tracks mounted on the exterior surface of bottom wall 54, and oriented parallel to a path of motion of carriage 52. FIG. 9 is an example of one such linear guide track 102, in the form of a linear ball slide. The base plate 101 can be slidably engaged with guide track 102 by mounting the base plate on a mounting platform 103. As shown in FIG. 9, mounting platform 103 includes a pair of slide arms 104, 105 that lock into "C" channels 106, 107, respectively, within guide track 102. The "C" channels contain ball bearing tracks. The fit of slide arms 104, 105 is tight enough to constrain motion of carriage 52 in a single dimension parallel to guide track 102. An example of a commercially available guide track, suitable for use with the opening and closing mechanism 16 of the present invention, is an Accuride™ rail. The direct mounting of carriage 52 onto base 18 significantly reduces the size of opening and closing mechanism 16, and makes the mechanism a modular assembly that can be readily removed from laser imaging machine 10 in one piece.

Although carriage 52 is described herein as being slidably coupled to slide along an exterior surface of bottom wall 54, alternative arrangements achieving similar size advantages are conceivable. For example, if the bar code is carried on cover 22 of cartridge 12, instead of being carried on the platform defined by recessed area 40, carriage 52 can be slidably coupled to slide over the top of base 18. Specifically, carriage 52 can be realized by a pair of shuttles slidably coupled in tracks mounted on opposite side walls 56B, 56C. In this case, the base plate 101 supporting bar code reader 88 can be coupled to the shuttles and arranged to extend transversely over the top of base 18 and cartridge 12. The bar code reader 88 then would read the bar code from overhead.

With reference to FIG. 5, carriage 52 includes a pair of flanged uprights 108, 110 at opposite ends of base plate 101. The uprights 108, 110 extend upward from base plate 101 at positions beyond the outer edges of base lip sections 60B, 60C, respectively. A pair of carriage brackets 112, 114 are pivotably coupled to carriage 52 via uprights 108, 110, respectively. The carriage brackets 112, 114 have first end portions 116, 118, respectively, coupled at opposite ends of base plate 101 with a pair of pivot pins. Specifically, the first end portion 116 of carriage bracket 112 is coupled to upright 108, whereas the first end portion 118 of carriage bracket 114 is coupled to upright 110. A pair of shaft brackets 120, 122 are pivotably coupled to carriage brackets 112, 114, respectively. The shaft brackets 120, 122 have first end portions pivotably coupled, respectively, to second end portions 124, 126 of carriage brackets 112, 114, with a pair of hinge pins.

FIG. 10 is an enlarged view of carriage bracket 114 and shaft bracket 122, relative to upright 110 of carriage 52. As shown in FIG. 10, the first end portion 118 of carriage bracket 114 is coupled to upright 110 by pivot pin 128. The pivot pin 128 allows carriage bracket 114 to pivot about an axis extending perpendicularly from upright 110 of carriage 52. A first end portion 130 of shaft bracket 122 is coupled to the second end portion 126 of carriage bracket 114 by hinge pin 132. The hinge pin 132 similarly allows shaft bracket 122 to pivot about an axis extending perpendicularly from carriage bracket 114. A bias means includes a pair of torsion springs. Each one of the pair of torsion springs is coupled between one of the carriage brackets 112, 114 and one of the shaft brackets 120, 122. As shown in FIG. 10, for example, a torsion spring 134 is coupled between carriage bracket 114 and shaft bracket 122. An identical torsion spring also is coupled between carriage bracket 112 and shaft bracket 120, but is not shown. The torsion spring 134 shown in FIG. 7 includes a coil section 136 wrapped around hinge pin 132, a bias section 138 oriented to apply force against shaft bracket 122, and a tail section 140 mounted within a notch 142 formed in carriage bracket 114. Another tail section of torsion spring 134 is mounted in a notch formed on an opposite side of carriage bracket 114 proximal to upright 110, but is not shown.

With reference to FIG. 5, shaft brackets 120, 122 include bearing mounts 144, 146, respectively, that rotatably support roller shaft 48. The bearing mounts 144, 146 receive mounting pins 74, 76 of roller shaft 48. The rotor shaft 77 of motor 50, which is coupled to roller shaft 48, extends into bearing mount 146 formed at a second end portion 148 of shaft bracket 122, shown in FIG. 10. The cylindrical coupler 79 shown in FIG. 8 may be disposed within bearing mount 146. The housing of motor 50 is fastened to shaft bracket 122 with a screw or other fastening means. Thus, shaft bracket 122 supports both roller shaft 48 and motor 50. Initially, roller shaft 48 resides below cartridge lip section 30A in a pair of support blocks. When motor 50 rotates roller shaft 48 in the first direction to open cover 22, projections 84 rotate toward lip section 60A to engage apertures 46 of cover 22. The projections 84 exert a pulling force on apertures 46. As roller shaft 48 continues to rotate, the pulling force enables the roller shaft to climb up over lip section 30A of cartridge tray 20. The force generated by the upward motion of roller shaft 48 over lip section 60A causes carriage brackets 112, 114 and shaft brackets 120, 122 to rotate upward about the pivot pins coupled to uprights 108, 110.

Carriage brackets 112, 114 each include, however, a roller that engages lip sections 60B, 60C of base 18 as carriage 52 moves during opening and closing operations. As shown in FIG. 10, for example, carriage bracket 114 includes a roller 142 positioned adjacent to second end portion 126 on a surface of the carriage bracket proximal to upright 110. When roller shaft 48 rotates, causing carriage bracket 114 to rotate upward, roller 142 engages lip section 60C to provide a means for stopping the upward rotation of the carriage bracket beyond a certain point. The shaft bracket 122 remains free to rotate upward about hinge pin 132 when carriage bracket 114 is stopped by roller 142. However, bias section 138 of torsion spring 134 prevents shaft bracket 122 from rotating upward beyond 180 degrees, relative to carriage bracket 114. The upward rotation of shaft bracket 120 is similarly constrained by the other torsion spring.

Once roller shaft 48 climbs up over lip section 30A, the torsion springs begin to apply a normal force that biases the roller shaft downward against lip sections 30B and 30C of cartridge 12. The normal force applied by the torsion springs generates added traction between roller shaft 48 and cover 22 during the opening and closing operations, and generates necessary sealing pressure. Until roller shaft 48 climbs completely up over lip section 30A, however, the torsion springs apply no load. As a result, it is not necessary for roller shaft 48 to overcome the spring load to climb onto lip section 30A. With no spring load to overcome, the pulling force exerted on apertures 46 by projections 84 is significantly reduced. Consequently, tearing of apertures 46 is reduced, thereby extending the life of cartridge 12.

FIG. 11 illustrates the opening and closing operations performed by opening and closing mechanism 16. The roller shaft 48 initially resides in support blocks 150, 152 mounted on an exterior surface of front wall 56A. The motor 50 starts the opening operation by rotating roller shaft 48 in the first direction to cause projections 84 to engage apertures 46 in cover 22. After engaging cover 22, the rotating roller shaft 48 rotates out of support blocks 150, 152, and climbs up over lip section 30A. Traction between roller shaft 48 and cover 22 produces translational force that causes the roller shaft to travel along lip sections 30B and 30C, thereby unpeeling cover 22. The normal force applied by the torsion springs biases end sections 70, 72 against lip sections 30B, 30, respectively, enhancing traction and resulting translational force. The translational force drives carriage 52 to slide along base 18 with roller shaft 48 and motor 50 in a direction away from front all 56A. As shown in FIG. 11, the rotation of roller shaft 48 in the first direction by motor 50 causes a portion 156 of cover 22 to be wound about the roller shaft, after being peeled away from the adhesive material 24 on lip sections 30A, 30C, and 30D. The motor 50 continues to rotate roller shaft 48 in the first, opening direction until tab 100 trips sensor 98, indicating that carriage 52 has reached the open position. The carriage 52 remains in the open position until it is desired to close cartridge 12.

The motor 50 initiates the closing operation by reversing direction to rotate roller shaft 48 in a second direction, opposite to the first direction. The rotation of roller shaft 48 and the normal force applied by the torsion springs contribute to traction that generates translational force in the second direction. The translational force drives carriage 52 to slide along base 18 in a direction toward front wall 56A. The pressure generated by the normal force applied by the torsion springs serves to provide an effective light-tight seal of cover 22 against lip sections 30A, 30C, and 30D. The end sections 70, 72 of roller shaft 48 are aligned with lip sections 30C and 30D, respectively, over lip sections 60B and 60C of base 18. The normal force applied by the torsion springs serves to bias end sections 70, 72 against lip sections 30C and 30D, respectively, as roller shaft 48 rotates to provide an effective light-tight seal between cover 22 and adhesive material 24. Because roller shaft 48 relies on traction, rather than winding force, to drive carriage 52 in both the opening and closing operations, undesirable stretching of cover 22 is avoided.

As carriage 52 approaches the closed position, roller shaft 48 reseals forward area 45 of cover 22 to lip section 30A of cartridge tray 20. As roller shaft 48 continues to rotate, projections 84 disengage apertures 46, and the shaft drops off of lip section 30A into support blocks 150, 152. During the closing operation, roller shaft 48 may encounter obstructions that can cause it to rotate out of proper angular alignment. Consequently, as roller shaft 48 rests in support blocks 150, 152 at the end of the closing operation, projections 84 may not occupy the correct rotational angle for the next opening operation. Therefore, in accordance with the present invention, opening and closing mechanism 16 may include a reset means, responsive when a rotational angle of roller shaft 48 differs from the desired rotational angle, for controlling motor 50 to rotate the roller shaft in the second direction until the rotational angle corresponds to the desired rotational angle.

The reset means includes a rotational position indicator coupled to rotate with roller shaft 48, and a detector for determining when the rotational angle of the roller shaft corresponds to the desired rotational angle based on a rotational position of the indicator. As shown in FIG. 12, for example, the rotational position indicator may comprise a circular disc 158 mounted on rotor shaft 77 of motor 50, and the detector may comprise an optical beam interrupt sensor 160 mounted adjacent support block 152. The rotational position indicator and detector can be realized by alternative means, such as electromagnetic or mechanical arrangements. The circular disc 158 rotates with rotor shaft 77 and roller shaft 48, which is coupled in substantial alignment with the rotor shaft. When roller shaft 48 has reached a position of proper rotational alignment, a slot 162 formed in circular disc 158 passes through an optical coupling channel of optical sensor 160. In response, optical sensor 160 transmits a termination signal to control circuitry associated with motor 50, indicating that rotation of roller shaft 48 should be terminated. Thus, in operation, the reset means restores roller shaft 48 to the correct rotational position after a closing operation by continuing to rotate the roller shaft with motor 50 until the termination signal is received.

To arrive at the correct rotational position, it may be necessary to rotate roller shaft 48 through an angle exceeding 270 degrees in the second, closing direction. For this reason, lip section 60A of base 18 is designed such that cartridge lip section 30A extends beyond base lip section 60A. As shown in FIG. 13, base lip section 60A resides on a front support lip 166 of base 18. The extension of cartridge lip section 30A enables projections 84 of roller shaft 48 to contact cartridge 12 without contacting base lip section 60A or front support lip 166. If base lip section 60A is not designed to be shorter than cartridge lip section 30A, cartridge 12 and base 18 can obstruct the rotation of roller shaft 48. In accordance with the present invention, however, when motor 50 rotates roller shaft 48 to arrive at the correct rotational position, projections 84 can contact cartridge lip section 30A to push cartridge 12 out of the way to clear any potential obstruction, as shown in FIG. 13. Once the closed cartridge 12 has been pushed toward rear area 58 of base 18, and roller shaft 48 has been restored to its proper rotational angle, the system user will open loading door 14 and remove the cartridge from laser imaging machine 10. The roller shaft 48 then resides in the correct position for opening the next cartridge loaded into laser imaging machine 10.

During the closing operation, roller shaft 48 preferably distributes sealing force evenly over cover 22 to provide an effective light-tight seal between the cover and lip sections 30A, 30C, and 30D, and to prevent the formation of wrinkles in the cover. In addition, during both the opening and closing operations, roller shaft 48 preferably drives carriage 52 without tractional slip. To achieve the above characteristics, in accordance with the present invention, roller shaft 48 may include a compliant coating 168 exhibiting a relatively high coefficient of friction with cover 22. The compliant friction coating 168 is illustrated in FIGS. 6, 7, and 13. The compliant characteristic of coating 168 evenly distributes sealing pressure to produce superior sealing throughout the life of cartridge 12, and to prevent the formation of wrinkles in cover 22. The frictional characteristic of coating 168, in combination with normal force applied by the torsion springs, provides additional traction to avoid slip. The traction enables roller shaft 48 to drive carriage 52 without relying on winding force, thereby avoiding stretch in cover 22. The compliant friction coating 168 thereby preserves the effectiveness of the light-tight seal to increase the useful life of cartridge 12 well beyond that previously achieved.

The coating 168 preferably comprises a thinly distributed elastomer material. An example of an elastomer material that can be manufactured with suitable compliance and coefficient of friction is polyurethane. In particular, a cast polyurethane provides a nonporous surface that exhibits a high coefficient of friction while resisting the accumulation of dust that can reduce effective friction. The portion of coating 168 formed over cut-out section 78 preferably is processed, by sand-blasting or grinding, for example, to reduce the coefficient of friction and tackiness of the cut-out section with cover 22. The reduced coefficient of friction prevents cover 22 from sticking to cut-out section 78 of roller shaft 48 and lifting up from lip section 30A at the end of the closing operation, thereby ensuring a light-tight seal over lip section 30A. The portions of coating 168 formed over end sections 70, 72 should be maintained in the cast state to provide a higher coefficient of friction with cover 22 over cartridge lip sections 30B, 30C. This higher coefficient of friction increases the traction of roller shaft 48 with cover 22 for driving carriage 52 in both the opening and closing directions.

The effectiveness of the light-tight seal achieved by roller shaft 48 is a combined function of the thickness of coating 168, the durometer of coating 168, and the spring force applied to the roller shaft by the torsion springs. Larger thicknesses, softer durometers, and heavy spring loads can independently, or in combination, cause excessive compression set of coating 168. Excessive compression set is undesirable because it may result in nonuniform winding of cover 22 about roller shaft 48 during the opening operation, and produce unevenness in the sealing pressure applied during the closing operation. Nonuniform winding can produce wrinkles in cover 22, whereas uneven sealing pressure can hinder the contact between cover 22 and adhesive material 24. On the other hand, smaller thicknesses, harder durometers, and heavy spring loads can independently, or in combination, cause adhesive material 24 to flow away from roller shaft 48 during the closing operation. The use of higher durometer elastomer materials for coating 168 may be acceptable with lower spring forces. Conversely, higher spring forces may dictate the use of lower durometer elastomer materials for coating 168, given a similar thickness. As one particular example, the use of a cast polyurethane material having a durometer of approximately 33 Shore A and a thickness of approximately 1.5 millimeters for coating 168 has been found to provide effective light-tight sealing of cover 22 when a spring force of approximately eight pounds per torsion spring is applied. For the above example, a commercially available cast polyurethane material providing acceptable compliance and friction is WINPHANE™ W644 33±4 Shore A durometer polyurethane, manufactured by Winfield Industries, Inc., of Buffalo, N.Y.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A mechanism for opening and closing a resealable cartridge having a tray and a flexible cover resealably engaged with said tray, said mechanism comprising:

a base for receiving said tray of said cartridge;

a roller shaft including means for engaging said cover of said cartridge; and a motor, having a rotor shaft coupled to said roller shaft such that a central longitudinal axis of said rotor shaft is in substantial coaxial alignment with a central longitudinal axis of said roller shaft, for rotating said roller shaft in a first direction to wind said cover about said roller shaft, thereby removing at least part of said cover from said tray, and for rotating said roller shaft in a second direction to unwind said cover from said roller shaft, thereby resealably engaging said cover with said tray.

2. The opening and closing mechanism of claim 1, wherein said resealable cartridge is a resealable photosensitive media cartridge containing photosensitive media.

3. The opening and closing mechanism of claim 1, further comprising a cylindrical coupler for coupling said rotor shaft to said roller shaft.

4. The opening and closing mechanism of claim 1, further comprising a carriage slidably coupled to said base, said carriage supporting said roller shaft and said motor, and being slidable along a path of motion relative to said base in response to force produced by said roller shaft during the rotation of said roller shaft by said motor in said first direction and in said second direction.

5. The opening and closing mechanism of claim 1, wherein said roller shaft includes a surface having a compliant friction coating.

6. The opening and closing mechanism of claim 1, further comprising:
- a carriage being slidable along a path of motion relative to said base in response to force produced by said roller shaft during the rotation of said roller shaft by said motor;
- a pair of carriage brackets, each one of said pair of carriage brackets having a first end pivotably coupled to said carriage;
- a pair of shaft brackets, each one of said pair of shaft brackets having a first end pivotally coupled to a second end of one of said pair of carriage brackets, wherein each one of said pair of shaft brackets rotatably supports said roller shaft, and one of said pair of shaft brackets supports said motor; and
- a pair of springs, each one of said pair of springs coupled between one of said pair of shaft brackets and one of said pair of carriage brackets, wherein said pair of springs bias said roller shaft toward said base during the rotation of said roller shaft by said motor in said first direction and in said second direction.

7. The opening and closing mechanism of claim 1, further comprising bias means or biasing said roller shaft toward said base during rotation of said roller shaft by said motor.

8. The opening and closing mechanism of claim 1, further comprising reset means, responsive when a rotational angle of said roller shaft differs from a desired rotational angle, for controlling said motor to rotate said roller shaft in said second direction until said rotational angle of said roller shaft corresponds to said desired rotational angle.

9. A mechanism for opening and closing a resealable cartridge having a tray and a flexible cover resealably engaged with said tray, said mechanism comprising:
- a base for receiving said tray of said cartridge;
- a roller shaft including means for engaging said cover of said cartridge, and a surface having a compliant friction coating; and
- a motor for rotating said roller shaft in a first direction to wind said cover about said roller shaft, thereby removing at least part of said cover from said tray, and for rotating said roller shaft in a second direction to unwind said cover from said roller shaft, thereby resealably engaging said cover with said tray.

10. The opening and closing mechanism of claim 9, wherein said resealable cartridge is a resealable photosensitive media cartridge containing photosensitive media.

11. The opening and closing mechanism of claim 9, wherein said compliant friction coating has a durometer of approximately 33 Shore A.

12. The opening and closing mechanism of claim 11, wherein said compliant friction coating has a thickness of approximately 1.5 millimeters.

13. The opening and closing mechanism of claim 12, further comprising bias means for biasing said roller shaft toward said base during rotation of said roller shaft by said motor, said bias means applying a force of approximately eight pounds at opposite ends of said roller shaft.

14. The opening and closing mechanism of claim 9, wherein said compliant friction coating comprises a substantially nonporous elastomer material.

15. The opening and closing mechanism of claim 14, wherein said substantially nonporous elastomer material comprises a cast polyurethane material.

16. The opening and closing mechanism of claim 15, wherein said cast polyurethane material has a durometer of approximately 33 Shore A.

17. The opening and closing mechanism of claim 16, wherein said cast polyurethane material has a thickness of approximately 1.5 millimeters, and a durometer of approximately 33 Shore A.

18. The opening and closing mechanism of claim 17, further comprising bias means for biasing said roller shaft toward said base during rotation of said roller shaft by said motor, said bias means applying a force of approximately eight pounds at opposite ends of said roller shaft.

19. The opening and closing mechanism of claim 9, wherein a portion of said compliant friction coating is processed to reduce a coefficient of friction of said portion of said compliant friction coating relative to said cover of said cartridge to prevent said cover of said cartridge from sticking to said portion of said compliant friction coating.

20. The opening and closing mechanism of claim 9, further comprising a carriage slidably coupled to said base, said carriage supporting said roller shaft and said motor, and being slidable along a path of motion relative to said base in response to force produced by said roller shaft during the rotation of said roller shaft by said motor.

21. The opening and closing mechanism of claim 19, further comprising bias means for biasing said roller shaft toward said base during rotation of said roller shaft by said motor, wherein said compliant friction coating has a coefficient of friction relative to said cover of said cartridge, said coefficient of friction and said bias means producing tractional force sufficient to drive said carriage along said path of motion during the rotation of said roller shaft by said motor.

22. The opening and closing mechanism of claim 9, further comprising:
- a carriage being slidable along a path of motion relative to said base in response to force produced by said roller shaft during the rotation of said roller shaft by said motor;
- a pair of carriage brackets, each one of said pair of carriage brackets having a first end pivotably coupled to said carriage;
- a pair of shaft brackets, each one of said pair of shaft brackets having a first end pivotally coupled to a second end of one of said pair of carriage brackets, wherein each one of said pair of shaft brackets rotatably supports said roller shaft, and one of said pair of shaft brackets supports said motor; and
- a pair of springs, each one of said pair of springs coupled between one of said pair of shaft brackets and one of said pair of carriage brackets, wherein said pair of springs bias said roller shaft toward said base during the rotation of said roller shaft by said motor.

23. The opening and closing mechanism of claim 9, further comprising bias means for biasing said roller shaft toward said base during rotation of said roller shaft by said motor.

24. The opening and closing mechanism of claim 9, further comprising means, responsive when a rotational angle of said roller shaft differs from a desired rotational angle, for controlling said motor to rotate said roller shaft in said second direction until said rotational angle of said roller shaft corresponds to said desired rotational angle.

25. A mechanism for opening and closing a resealable cartridge having a tray and a flexible cover resealably engaged with said tray, said mechanism comprising:

a base for receiving said tray of said cartridge;

a roller shaft including means for engaging said cover of said cartridge;

a motor for rotating said roller shaft in a first direction to wind said cover about said roller shaft, thereby removing at least part of said cover from said tray, and for rotating said roller shaft in a second direction to unwind said cover from said roller shaft, thereby resealably engaging said cover with said tray; and a carriage slidably coupled to said base, said carriage supporting said roller shaft and said motor, and being slidable along a path of motion relative to said base in response to force produced by said roller shaft as a result of the rotation of said roller shaft in both said first direction and said second direction by said motor.

26. The opening and closing mechanism of claim 25, wherein said resealable cartridge is a resealable photosensitive media cartridge containing photosensitive media.

27. The opening and closing mechanism of claim 25, wherein said carriage includes a base plate slidably engaged with at least one guide means mounted on a bottom surface of said base.

28. The opening and closing mechanism of claim 27, wherein said at least one guide means includes a pair of linear guide tracks.

29. The opening and closing mechanism of claim 25, further comprising:

a pair of carriage brackets, each one of said pair of carriage brackets having a first end pivotably coupled to said carriage;

a pair of shaft brackets, each one of said pair of shaft brackets having a first end pivotably coupled to a second end of one of said pair of carriage brackets, wherein each one of said pair of shaft brackets rotatably supports said roller shaft, and one of said pair of shaft brackets supports said motor; and a pair of springs, each one of said pair of springs coupled between one of said pair of shaft brackets and one of said pair of carriage brackets, wherein said pair of springs bias said roller shaft toward said base during the rotation of said roller shaft by said motor.

30. The opening and closing mechanism of claim 25, further comprising bias means for biasing said roller shaft toward said base during rotation of said roller shaft by said motor.

31. The opening and closing mechanism of claim 25, further comprising means, responsive when a rotational angle of said roller shaft differs from a desired rotational angle, for controlling said motor to rotate said roller shaft in said second direction until said rotational angle of said roller shaft corresponds to said desired rotational angle.

32. A mechanism for opening and closing a resealable cartridge having a tray and a flexible cover resealably engaged with said tray, said mechanism comprising:

a base for receiving said tray of said cartridge;

a roller shaft including means for engaging said cover of said cartridge;

a motor for rotating said roller shaft in a first direction to wind said cover about said roller shaft, thereby removing at least part of said cover from said tray, and for rotating said roller shaft in a second direction to unwind said cover from said roller shaft, thereby resealably engaging said cover with said tray;

a carriage being slidable along a path of motion relative to said base in response to force produced by said roller shaft during the rotation of said roller shaft by said motor;

a pair of carriage brackets, each one of said pair of carriage brackets having a first end pivotably coupled to said carriage;

a pair of shaft brackets, each one of said pair of shaft brackets having a first end pivotably coupled to a second end of one of said pair of carriage brackets, wherein each one of said pair of shaft brackets rotatably supports said roller shaft, and one of said pair of shaft brackets supports said motor; and a pair of springs, each one of said pair of springs coupled between one of said pair of shaft brackets and one of said pair of carriage brackets, wherein said pair of springs bias said roller shaft toward said base during the rotation of said roller shaft by said motor.

33. The opening and closing mechanism of claim 32, wherein said resealable cartridge is a resealable photosensitive media cartridge containing photosensitive media.

34. The opening and closing mechanism of claim 32, wherein when said roller shaft rotates in said first direction, said carriage brackets, and said shaft brackets are pivotable about said carriage in an upward direction relative to said base, wherein said base includes a lip, and each one of said pair of carriage brackets includes a stop mechanism for engaging said lip to constrain upward pivoting of said carriage brackets.

35. The opening and closing mechanism of claim 34, wherein said stop mechanism of each one of said pair of carriage brackets comprises a roller oriented to ride along a bottom surface of said lip.

36. The opening and closing mechanism of claim 34, wherein, when said upward pivoting of said carriage brackets is constrained by said stop mechanism, said springs apply a force against upward pivoting by said shaft brackets, said force applied by said springs biasing said roller shaft toward said base during the rotation of said roller shaft by said motor.

37. The opening and closing mechanism of claim 32, wherein each one of said pair of springs is coupled between one of said pair of shaft brackets and one of said pair of carriage brackets to bias said roller shaft toward said base with a force of approximately eight pounds.

38. A mechanism for opening and closing a resealable cartridge having a tray and a flexible cover resealably engaged with said tray, said mechanism comprising:

a base for receiving said tray of said cartridge;

a roller shaft including means for engaging said cover of said cartridge;

a motor for rotating said roller shaft in a first direction to wind said cover about said roller shaft, thereby removing at least part of said cover from said tray, and for rotating said roller shaft in a second direction to unwind said cover from said roller shaft, thereby resealably engaging said cover with said tray; and reset means, coupled to said motor and responsive when a rotational angle of said roller shaft differs from a desired rotational angle, for controlling said motor to rotate said roller shaft in said second direction until said rotational angle of said roller shaft corresponds to said desired rotational angle.

39. The opening and closing mechanism of claim 38, wherein said resealable cartridge is a resealable photosensitive media cartridge containing photosensitive media.

40. The opening and closing mechanism of claim 38, wherein said reset means comprises:

a rotational position indicator coupled to rotate with said roller shaft; and a detector for determining when said rotational angle of said roller shaft corresponds to said desired rotational angle based on a rotational position of said rotational position indicator.

* * * * *